No. 809,554. PATENTED JAN. 9, 1906.
H. W. N. COLE.
MACHINE FOR MOLDING ARTICLES FROM PLASTIC MATERIALS.
APPLICATION FILED APR. 30, 1904.
3 SHEETS—SHEET 1.
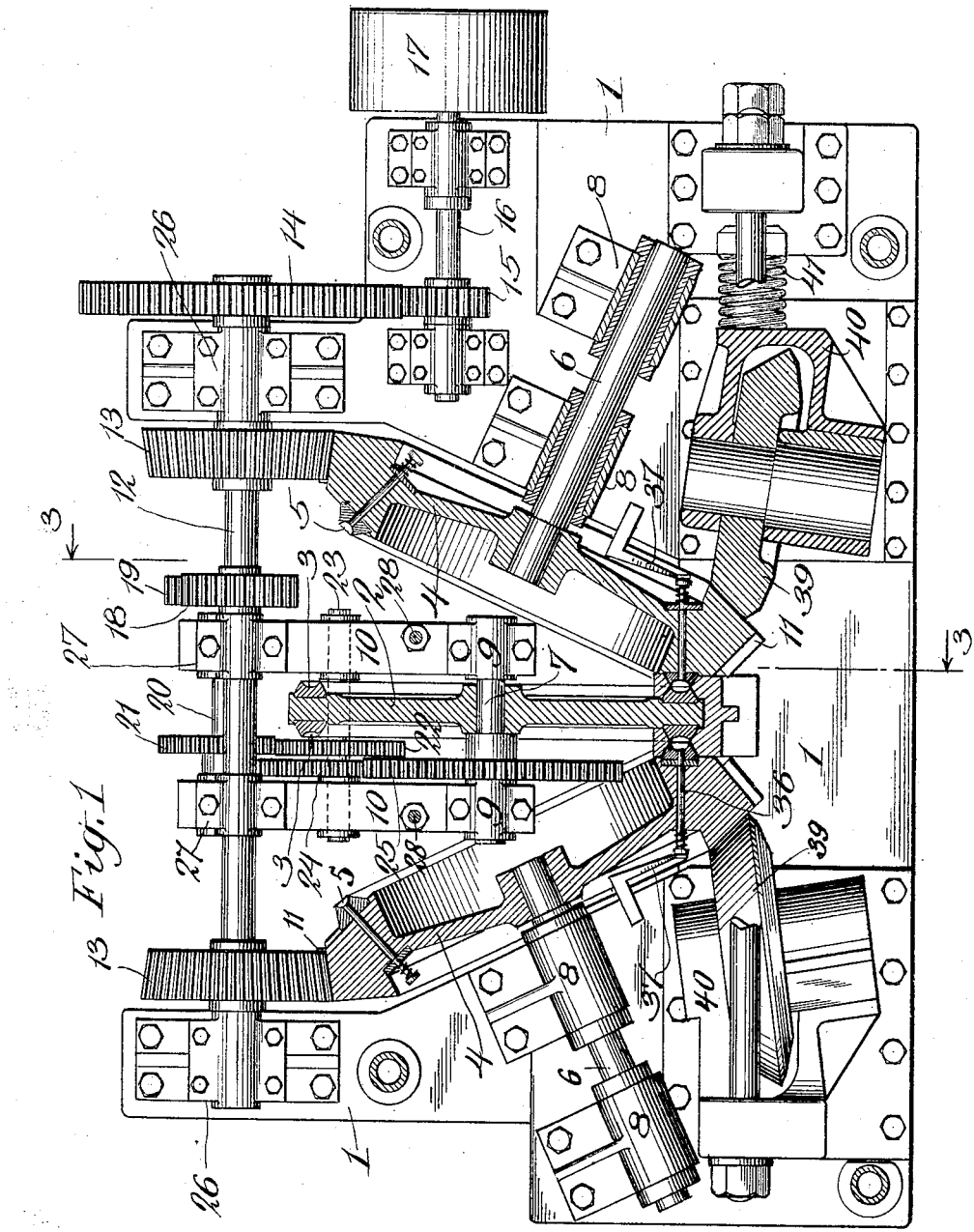
WITNESSES:
INVENTOR
Henry W. N. Cole
BY
Chapin Rayford Mable
his ATTORNEYS

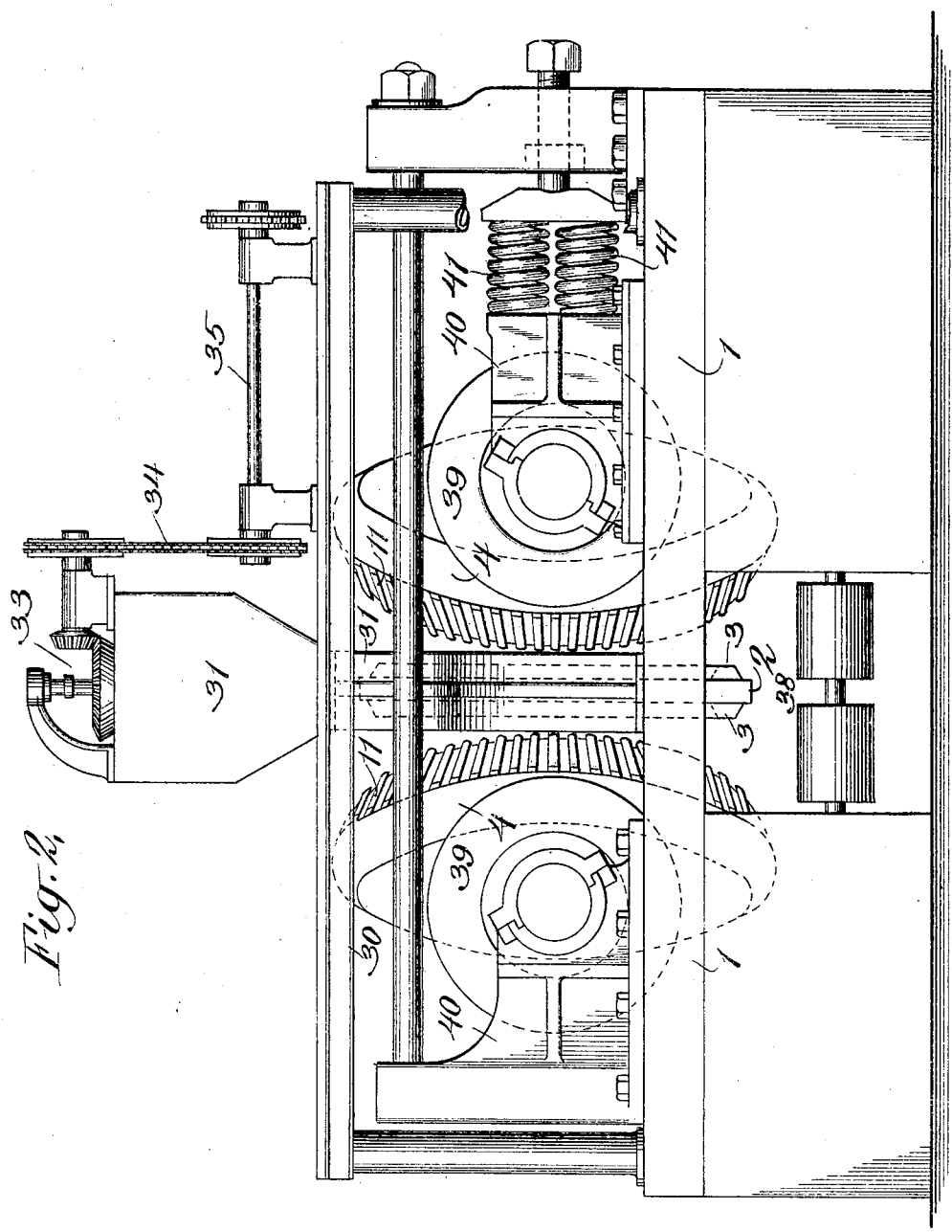

No. 809,554. PATENTED JAN. 9, 1906.
H. W. N. COLE.
MACHINE FOR MOLDING ARTICLES FROM PLASTIC MATERIALS.
APPLICATION FILED APR. 30, 1904.
3 SHEETS—SHEET 3.
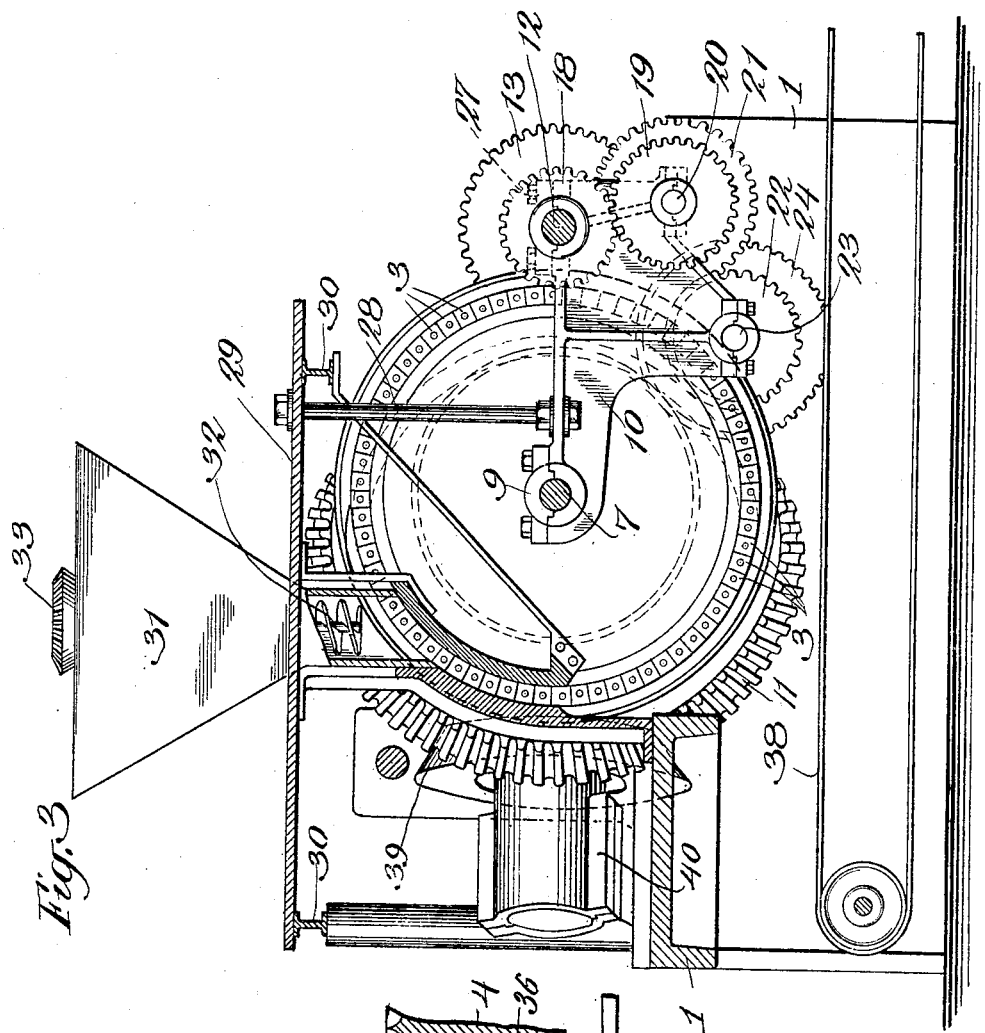
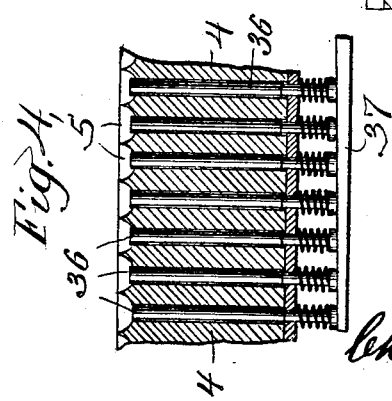
WITNESSES:
INVENTOR
Henry W. N. Cole
BY
Chapin Raymond Mable
his ATTORNEYS dd
UNITED STATES PATENT OFFICE.

HENRY W. N. COLE, OF BROOKLYN, NEW YORK, ASSIGNOR TO THE BRIQUETTING COMPANY, OF NEW YORK, N. Y., A CORPORATION OF NEW JERSEY.

MACHINE FOR MOLDING ARTICLES FROM PLASTIC MATERIALS.

No. 809,554.  Specification of Letters Patent.  Patented Jan. 9, 1906.

Application filed April 30, 1904. Serial No. 205,657.

*To all whom it may concern:*

Be it known that I, HENRY W. N. COLE, a citizen of the United States of America, and a resident of Brooklyn, county of Kings, State of New York, have invented certain new and useful Improvements in Machines for Molding Articles from Plastic Materials, of which the following is a specification, reference being had to the accompanying drawings, forming a part thereof.

My invention relates to improvements in machines for molding articles from plastic materials, and particularly to rotary peripheral molding-machines such as are adapted for making fuel-briquets and the like. In machines of this class as heretofore constructed it has been common to arrange two bevel-faced mold-wheels with their shafts arranged obliquely to each other and their lateral molding-faces convergent toward the molding-point and to provide pressure-rolls substantially opposite the molding-point to prevent the wheels from spreading. In my present invention I interpose a third mold-wheel between the two oblique mold-wheels having lateral molding-faces upon opposite sides thereof, such lateral molding-faces in register with the lateral molding-faces of the oblique wheels. By this means I double the capacity of a molding-machine of this type, while increasing the power required to drive same and the lateral resistance upon the pressure-rolls very much less proportionately.

My invention also consists in certain improved means for driving the wheels, in the employment of yielding pressure-rolls in place of the rigid pressure-rolls ordinarily employed, in a novel form of ejector employed, and in certain improved details of construction and combination of parts, as will hereinafter be more fully pointed out.

The main objects of my invention are to increase the capacity of a machine of this description, while proportionately decreasing the power necessary to drive it and the pressure required at the molding-point to hold the molding-dies up to their work, to positively drive the mold-wheels and maintain them in register, to provide for permitting the wheels to spread under undue pressure, to positively and simply eject the articles formed, and generally to improve and strengthen machines of this type.

I will now proceed to describe a machine embodying my invention and will then point out the novel features in claims.

In the drawings, Figure 1 is a top view of a machine embodying my invention, with the mold-wheels, one of the pressure-rolls, and certain correlated parts in horizontal section. Fig. 2 is an end view of the machine. Fig. 3 is a view in vertical transverse section substantially upon the plane of the line 3 3 of Fig. 1. Fig. 4 is a detail view illustrating a portion of one of the mold-wheels, the ejectors therefor, and a portion of the cam for operating same.

In the embodiment of my invention illustrated, 1 designates the main frame of the machine, 2 an intermediate mold-wheel having lateral molding-faces 3 upon opposite sides thereof, and 4 4 outer mold-wheels having lateral molding-faces 5 arranged on one side thereof and arranged to register with the molding-faces 3 3 of the wheel 2. The lateral molding-faces 3 of the intermediate wheel 2 are disposed in a vertical plane, and the axis of said wheel is horizontal and in a vertical plane at right angles to the lateral molding-faces of said wheel. The molding-faces of the wheels 4 4 are beveled or conical and are arranged in tangential contact with the molding-faces of the intermediate mold-wheel, the axes of the shafts 6 of said outer mold-wheels being arranged obliquely to the axis of the shaft 7 for the intermediate mold-wheel. The shafts 6 of the outer mold-wheels 4 are journaled in suitable bearings 8 8, secured to or forming a part of the main frame 1 of the machine, and the shaft 7 of the intermediate mold-wheel 2 is journaled in bearings 9 9, formed in brackets 10 10, also constituting a part of the frame of the machine.

In order that the mold-wheels may be driven positively and maintained accurately in register, I have provided the mold-wheels 4 with peripheral gear-teeth 11 and have provided a drive-shaft 12, carrying bevel-gears 13, having their teeth in driving relation therewith. This affords a powerful drive for the mold-wheels, maintaining them accurately in register and preventing vibrating and chattering. The drive-shaft 12 may be driven from any suitable source, as through a spur-gear 14 and pinion 15, the latter mounted upon a power-shaft 16, carrying a belt-pulley 17, to which power may be applied. In order to drive the central wheel and maintain same in register with the outer wheels, I have provided the drive-shaft 12 with a pinion 18, having its teeth in mesh with another pinion 19 upon an intermediate stub-shaft 20. The shaft 20 is maintained in suitable bearings upon the main frame of the machine and carries another pinion 21, whose teeth are in mesh with a gear-wheel 22, mounted upon a second intermediate shaft 23. The said shaft 23 is also mounted in bearings upon the main frame of the machine and carries a gear-wheel 24, whose teeth are in mesh with a drive-gear 25, fast upon the shaft 7 of the wheel 2. The ratio of the gearing just described is such as to maintain the wheel 2 in proper driving relation with the wheels 4 4, so that the molding-faces will always be in correct registry. As a matter of construction it will be noted that the main bearings 26 for the shaft 12 are directly bolted to the bed-plate of the machine, while the brackets 10, which carry the bearings 9 for the shaft 7, the bearings for the shaft 23, and the bearings for the shaft 20, are supported from bearings 27, which rest upon the shaft 12, and by suspension-rods 28, which hang from a plate 29, supported by girders 30.

The material to be formed into the briquets or like articles is introduced into a receiving and feeding hopper 31, which hopper is provided with suitable means for feeding the material—as, for instance, a feed-screw 32, driven by means of bevel gear-wheels 33 and a sprocket-chain connection 34 with a drive-shaft 35. The hopper is situated above the point of peripheral contact of the mold-wheels, so that material fed therethrough will be received by the wheels above the molding-point and compressed by the said wheels as the material is carried to the molding-point, as will be clearly seen from an examination of the drawings. In order that the molded articles may be positively ejected, I have provided a plurality of ejectors 36, spring-operated in one direction to a position with their inner ends flush with the inner walls of the molds and operated in the other direction by stationary cams 37, which will gradually force the ejectors inward, as shown in the detail Fig. 4, as those portions of the wheels carrying them pass down away from the molding-point. This mechanism will positively eject the molded articles, which are permitted to fall upon a belt conveyer 38, by which they may be conveyed to any suitable point as may be desired. The pressure at the molding-point in this class of machine is enormous, and in order to properly resist this pressure I have provided pressure-rolls 39, which engage the rear faces of the mold-wheels 4. These pressure-rolls are suitably mounted in yokes 40, which slide in bearings upon the main frame of the machine. Heavy springs 41 resist the rearward movement of these yokes and the pressure-rolls carried thereby, which springs are designed to be strong enough to effectually resist any movement in the normal operation of the machine, but will permit movement under undue strains caused by an excess of material between the molding-faces or by some foreign substance which may accidentally be interposed. In order to permit this outward movement, the shafts 6 of the mold-wheels 4 are permitted a limited longitudinal sliding movement in their bearings 8, such movement being resisted by the springs 41, as above stated.

It will be obvious that the foregoing is but one embodiment of my invention and that the same is capable of many and varied modifications within the spirit and scope of my invention, and, further, that certain parts may be employed in connection with other parts of different construction. Hence I do not desire to be limited only to the precise details of construction and combination of parts herein.

What I claim is—

1. In a machine of the class described, the combination with an intermediate mold-wheel having oppositely-disposed independent lateral mold-recesses, of two mold-wheels arranged upon opposite sides of said intermediate wheel, and having lateral mold-recesses in register with the respective mold-recesses of the said intermediate mold-wheel, and means for driving the said mold-wheels and retaining their respective mold-recesses in register.

2. In a machine of the class described, the combination with an intermediate mold-wheel having two oppositely-disposed lateral molding-faces, of two mold-wheels arranged upon opposite sides of said intermediate wheel, and having lateral molding-faces in register with the molding-faces of the said intermediate mold-wheel, and means for driving the said mold-wheels, including gear-wheels for engaging the peripheries of the two said outer mold-wheels.

3. In a machine of the class described, the combination with an intermediate mold-wheel having two oppositely-disposed lateral molding-faces, of two mold-wheels arranged upon opposite sides of said intermediate wheel, and having lateral molding-faces in register with the molding-faces of the said intermediate mold-wheel, yielding pressure-rolls engaging the outer mold-wheels opposite the pressure-point, and means for driving the said mold-wheels.

4. In a machine of the class described, the combination with an intermediate mold-wheel having two oppositely-disposed lateral molding-faces, of two mold-wheels arranged upon opposite sides of said intermediate wheel, and having lateral molding-faces in register with the mold-faces of the said intermediate mold-wheel, said outer mold-wheels arranged to slide longitudinally in their bearings, spring pressure-rolls engaging said mold-wheels opposite the pressure-point and resisting said longitudinal movement, and means for driving said mold-wheels.

5. In a machine of the class described, the combination with a plurality of mold-wheels having lateral molding-faces in register with each other, and shafts upon which said mold-wheels are mounted, the axes of rotation of said wheels arranged obliquely to each other, of bearings rotatably supporting the shafts of said mold-wheels and permitting limited longitudinal movement thereof, spring pressure-rolls engaging said mold-wheels, substantially opposite the pressure-point, and means for driving the said mold-wheels.

6. In a machine of the class described, the combination with a plurality of mold-wheels having lateral molding-faces in register with each other, the axes of rotation of said wheels arranged obliquely to each other, said wheels having outwardly-projecting peripheral teeth, of driving-wheels therefor engaging said peripheral teeth, and a single shaft upon which both said driving-wheels are mounted.

7. A machine for the purpose specified, having an intermediate mold-wheel with two lateral molding-faces, each lying in a plane at right angles to the axis of the wheel, two similar oblique mold-wheels situated at the respective opposite sides of said intermediate wheel, each of said oblique wheels having a conical, bevel molding-face in tangential contact with a lateral face on said intermediate wheel, the molds, and means for rotating said mold-wheels.

8. A machine for the purpose specified, having oblique mold-wheels 4 and an intermediate mold-wheel 2, said wheels carrying recessed molds in their molding-faces and having in each mold-recess an automatic ejector for the briquets.

9. A machine for the purpose specified having two oblique mold-wheels, and an intermediate mold-wheel, said wheels carrying recessed molds in their molding-faces, and having also means for driving said wheels in unison from their peripheries and means for pressing together their molding-faces.

In witness whereof I have hereunto set my hand this 29th day of April, 1904.

HENRY W. N. COLE.

Witnesses:
D. HOWARD HAYWOOD,
C. L. HALL.